United States Patent [19]

Akashi et al.

[11] Patent Number: 4,478,897
[45] Date of Patent: Oct. 23, 1984

[54] COMPOUND MOLDING

[75] Inventors: Tohru Akashi, Nagoya; Yutaka Watanabe, Toyoake, both of Japan

[73] Assignee: Aisin Seiki Kabushiki Kaisha, Japan

[21] Appl. No.: 485,829

[22] Filed: Apr. 18, 1983

Related U.S. Application Data

[63] Continuation of Ser. No. 300,736, Sep. 10, 1981, abandoned.

[30] Foreign Application Priority Data

Sep. 12, 1980 [JP] Japan .................................. 55-130609

[51] Int. Cl.³ .................... B32B 15/08; B60R 13/02
[52] U.S. Cl. .................................... 428/31; 428/217;
428/462; 428/463; 428/192; 428/517; 428/518;
428/519; 428/520; 428/510; 52/716
[58] Field of Search ................. 428/31, 217, 462, 463,
428/517, 518, 519, 520, 510, 192; 52/716

[56] References Cited

U.S. PATENT DOCUMENTS

| | | |
|---|---|---|
| 2,549,315 | 4/1951 | Kramer . |
| 2,654,919 | 10/1953 | Marvin . |
| 3,136,676 | 6/1964 | Fisch . |
| 3,189,143 | 6/1965 | Adams . |
| 3,245,864 | 4/1966 | Shanok et al. . |
| 3,338,007 | 8/1967 | Draplin . |
| 3,419,458 | 12/1968 | Brooks et al. . |
| 3,714,751 | 2/1973 | Lackey . |
| 3,745,056 | 7/1973 | Jackson . |
| 3,766,697 | 10/1973 | Jackson . |
| 3,783,568 | 1/1974 | Adler et al. . |
| 3,851,432 | 12/1974 | Griffin . |
| 3,981,697 | 9/1976 | Buckthorpe . |
| 4,094,056 | 6/1978 | Takeda et al. . |
| 4,113,295 | 9/1978 | Wenrick . |
| 4,163,076 | 7/1979 | Katoh . |
| 4,292,354 | 9/1981 | Katoh .................................. 428/462 |
| 4,298,640 | 11/1981 | Katoh .................................. 428/462 |

FOREIGN PATENT DOCUMENTS 893413  4/1962  United Kingdom .

Primary Examiner—Alexander Thomas
Attorney, Agent, or Firm—Finnegan, Henderson, Farabow, Garrett & Dunner

[57] ABSTRACT

A compound molding, suitable for use on automotive vehicle bodies, comprises a surface layer portion made of a hard resin, an intermediate layer made of a resin, a central metal portion, and a protective portion made of a soft vinyl chloride resin at least at one edge portion of the molding where the molding contacts the vehicle body or window glass.

7 Claims, 3 Drawing Figures

COMPOUND MOLDING

This is a continuation of application Ser. No. 300,736 filed Sept. 10, 1981, now abandoned.

BACKGROUND OF THE INVENTION

This invention relates to moldings in general, and more particularly to automobile moldings.

It is conventional to use moldings in the form of elongated members in the construction of automobiles and the like. Moldings are normally used at the interfaces of adjacent body elements for the purposes of sealing joints against intrusion by the elements and for improving the appearance of the automobile.

A form of molding which is conventionally used includes a glassy resin, such as CAB (cellulose acetate butyrate) resin, hard vinyl chloride, polycarbonate resin or the like adhered to the surface of a metallic molding strip. The resin coating adds strength to the molding, and improves the external appearance thereof.

While in operation, an automobile may generate substantial vibrations which may be transmitted to the moldings attached to the automobile body. As a result, the moldings will be caused to vibrate against the surfaces with which they are in contact. Since the resins used in conventional moldings are rather hard materials, molding in contact with windows of the vehicle will generate unpleasant noises as they vibrate against the glass. Moldings in contact with metallic body portions of the vehicle, in addition to generating undesirable noises, will damage the paint on the metal, allowing rust to develop.

It is an object of the present invention to provide a molding which eliminates the disadvantages associated with previous known moldings.

It is also an object of this invention to provide a compound molding which eliminates the disadvantages associated with compound moldings known in the prior art.

It is another object of the present invention to provide an improved compound molding, utilizing comparatively simple mechanical components, which is economical to manufacture.

It is still another object of this invention to provide an improved compound molding which eliminates unnecessary vibrational noises as well as damage to painted surfaces of an automobile.

Other objects and their attendant advantages will be understood more clearly and fully from the following detailed description of preferred embodiments of the present invention, when read with reference to the accompanying drawings.

SUMMARY OF THE INVENTION

The present invention comprises a compound molding strip for a motor vehicle. The molding of the present invention may be advantageously used as a window molding or a roof molding. The present molding strip comprises a surface layer made of a hard resin, an intermediate layer made of a resin, a central metal portion, and a protective portion made of a soft vinyl chloride resin located at least at one edge portion of the molding strip. The various layers are advantageously formed as an integral unit by an extrusion process. When used as a window molding, one edge of the molding of the present invention is affixed to a car body, while the other edge thereof contacts a window glass of the car. When used as a roof molding, one edge portion of the molding may be mounted, for example, on a roof channel of the car, while the other edge portion thereof contacts the roof.

DESCRIPTION OF THE PREFERRED EMBODIMENTS

Figure 1:
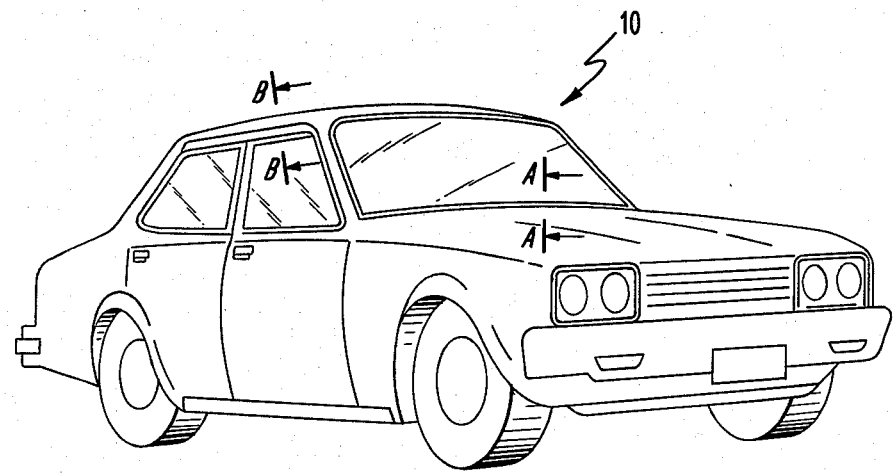
FIG. 1 is an overall view of an automobile, illustrating certain positions at which the molding of the present invention may be used.
Figure 2:
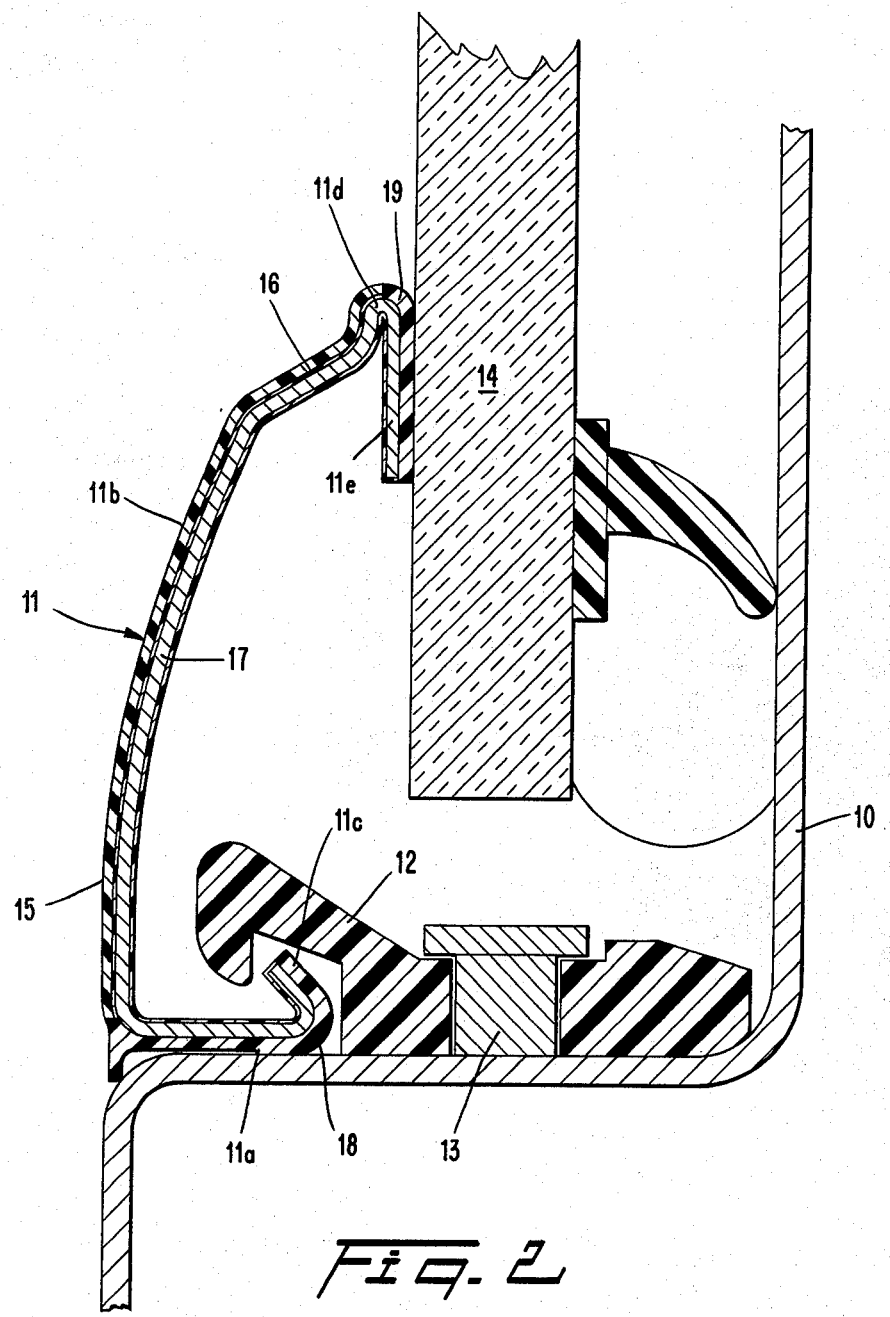
FIG. 2 is a sectional view taken along line AA of FIG. 1.

FIG. 1 shows an overall external view of an automobile, indicating certain positions at which the molding of the present invention may be used. FIG. 2, a cross-sectional view taken along line AA of FIG. 1, illustrates an embodiment of the invention used as a window molding. Although FIG. 1 indicates that the molding is used in conjunction with the windshield of the vehicle, it is to be understood that it may also be used in conjunction with window portions at the rear or side portion of the automobile or automobiles.

FIG. 2 illustrates a compound molding in accordance with the present invention, designated generally by reference numeral 11. The molding strip 11 is fixed on the car body 10 at one edge by means of a clip 12 and a T-shaped stud 13. The other edge of the molding 11 is in contact with window glass 14 of the automobile. The molding comprises elastically resilient materials and is held against the glass 14 by means of its own elastic holding force reacting against the clip 12.

The window molding strip 11 illustrated in FIG. 2 has a generally C-shaped cross section. A first edge portion 11a of the molding is bent to form substantially a right angle with central portion 11b thereof. At the extreme edge of the first edge portion 11a there is provided an anchor portion 11c for engaging the clip 12. At the second edge portion 11d of the molding 11 there is provided edge 11e extending from the mid-portion 11b. Edge 11e extends generally toward the inside of the C-shaped cross section.

Molding 11 comprises a surface layer 15 made from a weather resistent rigid plastic such as CAB resin, PC (Polycarbonate) resin, PVC resin or the like, and an intermediate layer 16 made of a resin such as ABS (acrylonitrile butadiene styrene) resin, AAS (Acrylate Styrene Acrylonitrile) resin or the like, a central metal portion 17 made of a material such as cold rolled stainless steel or cold rolled carbon steel, and protective portions 18 and 19. The protective portions are made of a soft vinyl chloride resin and are arranged on portions of the molding strip where the periphery of the first edge portion 11a contacts the car body 10 and where the periphery of the second edge portion 11d, 11e contacts the window glass 14. Protective portion 18 is interposed between the first edge portion 11a of the molding and the car body 10, thereby preventing damage to the car body. Protective portion 19 is interposed between the second edge portion 11d and the window glass 14, thereby preventing the generation of vibration noises at the interface between the molding and the glass.

The molding of the present invention may be integrally formed by, for example, a plastic extrusion molding process known in the art. As a result, the molding is a cohesive, compound structure of integrally formed components.

Figure 3:
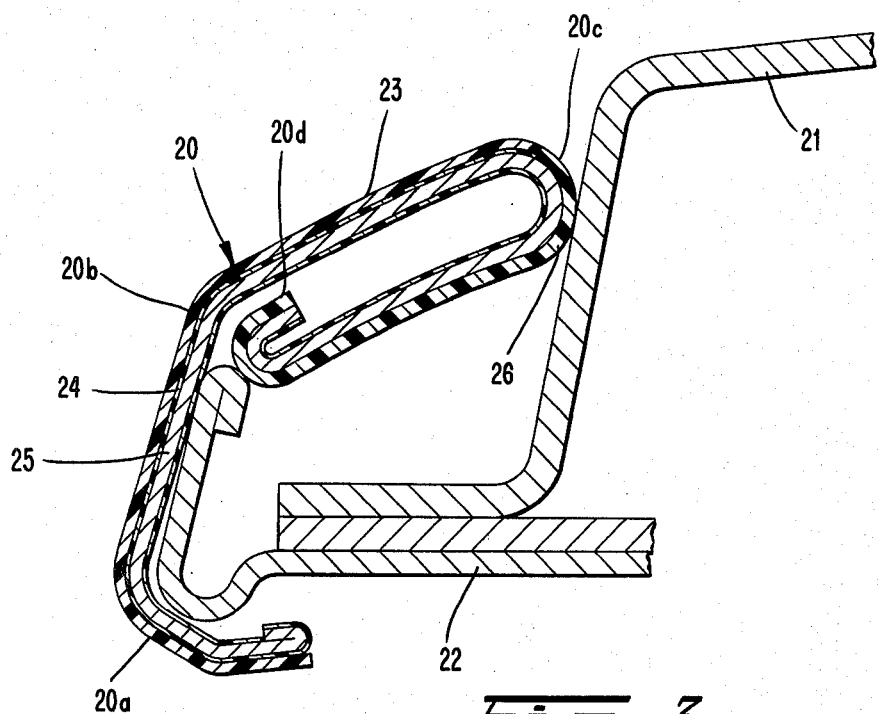
FIG. 3 is a sectional view taken along line BB of FIG. 1.

FIG. 3 illustrates an embodiment of the present invention, indicated generally by reference numeral 20, used as a roof molding. One edge portion of the roof molding strip 20 is for fixing onto a roof channel 22 formed on or adjacent to the vehicle roof 21. The other edge portion of the molding 20 contacts the car roof. The first edge portion 20a of the roof molding 20 is bent with respect to middle portion 20b, giving the edge portion 20a a generally C-shaped cross section. The second edge portion 20c extends from middle portion 20b and comprises a peripheral portion which contacts the roof 21. Extending from edge portion 20c is a portion of the molding which is approximately parallel to part of middle portion 20b and comprises a bend 20d at the edge thereof.

Roof molding 20 comprises a surface layer 23 made of a weather resistent rigid plastic such as CAB resin, PC resin, PVC (polyvinylchloride) resin, or the like, an intermediate layer 24 made of a resin such as ABS resin, AAS resin, or the like, a central metal portion 25 made of a material such as SUS (stainless steel) foil, or SPC (cold rolled carbon steel) material, and a protective portion 26. The protective portion is made of a soft vinyl chloride resin which is arranged on a portion of the molding where the periphery of the second end portion 20c contacts the car roof 21. The roof molding 20 is fixed on the roof channel 22 by means of the first end portion 20a and the bend 20d. The molding is maintained in contact with the car roof by means of the elastic holding force of the molding, which comprises elastically resilient material, acting on the roof channel 22. The protective portion 26, interposed between the second end portion 20c and the car roof, prevents damage to the car roof and the painted surface thereon.

The roof molding of the present invention may also be integrally formed by, for example, a plastic extrusion molding process known in the art. As a result, the molding becomes a compound molding of integrally formed components.

Thus, the compound molding in accordance with the present invention is characterized in that the part or parts thereof which contact the car body or the window glass are provided with a protective portion made of a soft vinyl chloride resin, thereby preventing damage to the painted surface of the car body and preventing rusting of the underlying metal. The molding of the present invention also prevents generation of vibration induced noises between the molding and the window glass or body surface with which the molding is in contact.

While the present invention has been disclosed with reference to the accompanying drawings, illustrating specific embodiments thereof, such are not to be considered as limiting the invention. The present invention is limited only by the appended claims, and includes modifications which would be obvious to those of ordinary skill in the art.

What is claimed is:

1. A compound molding comprising:
    a front surface layer portion made of a hard resin selected from the group consisting of cellulose acetate butyrate, polycarbonate, and polyvinylchloride;
    a central base metal portion comprising material selected from the group consisting of cold rolled stainless steel and cold rolled carbon steel;
    a resinous layer portion intermediate said front surface layer portion and said central base metal portion, said intermediate layer comprising resin selected from the group consisting of acrylonitrile butadiene styrene and acrylate stryene acrylonitrile;
    at least one end of said central base metal portion having a section extending beyond said front surface layer portion and said resinous layer portion; and
    a protective portion made of a soft vinyl chloride resin on each said extended section of said central base metal portion of said molding and forming a continuous surface with said front surface layer portion and interfacing with said front surface layer portion and said resinous layer portion.

2. A compound molding according to claim 1 wherein said molding portions are integrally molded.

3. A compound molding according to claim 1 wherein said molding has a generally C-shaped cross section.

4. A compound molding according to claim 3 wherein said compound molding is a window molding, wherein a first edge of said molding is to be fixed to a vehicle body and a second edge end of said molding contacts a window glass of said vehicle.

5. A compound molding according to claim 4 wherein said protective portion is arranged on a contact portion of said molding where the periphery of said first edge contacts with said vehicle body and on a contact portion where the periphery of said second edge contacts said window glass.

6. A compound molding according to claim 3 wherein said compound molding is a roof molding, wherein a first edge of said molding is to be fixed to a roof channel of a vehicle and a second edge of said molding contacts the roof of said vehicle.

7. A compound molding according to claim 6 wherein said protective portion is arranged on a contact portion of said molding where the periphery of said second edge contacts said vehicle roof.

* * * * *